UNITED STATES PATENT OFFICE.

CECIL O. PHILLIPS, OF NEW YORK, N. Y.

TREATMENT OF COTTON-SEED MEATS.

1,278,073.  Specification of Letters Patent.  Patented Sept. 3, 1918.

No Drawing.  Application filed August 21, 1917. Serial No. 187,350.

*To all whom it may concern:*

Be it known that I, CECIL O. PHILLIPS, a citizen of the United States, residing at New York, in the county of New York, State of New York, have invented certain new and useful Improvements in Treatment of Cotton-Seed Meats; and I do hereby declare the following to be a full, clear, and exact description of the invention, such as will enable others skilled in the art to which it appertains to make and use the same.

This invention relates to improvements in the extraction of oil from crushed cotton-seed meats. The invention is based upon the discovery that the extraction of oil from cottonseed meats can be materially improved and the amount of oil extracted increased by cooking the ground meats in intimate admixture with a small amount of a dilute solution of an alkali carbonate, such as sodium bi-carbonate, and by expressing the oil from the resulting cooked meats.

In the extraction of oil from cottonseed, as commonly practised, the seeds are decorticated or hulled and the kernels or meats are separated from the hulls before the oil is extracted. The meats are then ground or crushed and reduced to a finely-divided state and are then subjected to a cooking operation to promote the subsequent expression of the oil, after which the oil is expressed from the cooked meats under a heavy pressure.

The extraction of the oil from the cottonseed meats in this way leaves a considerable portion of the oil in the meats, amounting to around 6% or more.

I have found that the amount of oil left in the meats can be appreciably reduced, and the amount of oil extracted correspondingly increased, by carrying out the cooking operation with a small amount of a very dilute alkali carbonate solution of appropriate character intimately combined with the ground meats, so that they are subjected to the action of such alkaline solution during the cooking operation.

The alkali carbonate solutions which I have found of particular advantage in the practice of the invention, are solutions of sodium bicarbonate.

In the practice of the invention, the dilute alkali carbonate solutions may, with advantage, be preliminarily added to the crushed meats and intimately combined therewith before the cooking operation commences. Inasmuch as the alkali carbonate solutions are used only in small amounts, for example, three gallons per ton of seed, and since these solutions are very dilute, it is important that they should be thoroughly and intimately intermixed with the crushed meats so that the entire mass of the meats may be acted upon thereby in a uniform manner.

When using a solution of sodium bicarbonate, I have found that different strengths and different quantities may be used, but that the best results have been usually obtained with a solution containing one-tenth pound of sodium bicarbonate to the gallon and by the use of approximately three gallons of the solution for the meats from each ton of seed treated (each ton of seed giving approximately 1300 pounds of meats).

In the practice of the invention, the seed may be decorticated and the meats crushed or ground in any suitable manner such as is commonly employed for the purpose. The crushed meats may then be sprayed with the alkali carbonate solution or the solution may be otherwise added; but the solution should be uniformly and intimately distributed throughout the entire mass of the meats, so that its action will be thorough and uniform. The meats are then ready for the cooking operation which may likewise be carried out in common forms of cookers and which will vary somewhat depending upon the nature of the meats and the conditions under which the cooking is carried out. The cooking period may thus vary from 15 to 40 minutes, and is commonly carried on in steam-jacketed heaters with a steam pressure of from 20 to 100 pounds, and with appropriate agitation of the meats during the cooking. During the cooking operation, the oil becomes more fluid, the albuminous and mucilaginous constituents of the meats are cooked or coagulated, and the oil cells expanded, and the meats otherwise changed so that the subsequent removal of the oil therefrom is facilitated. I have found that the utilization of the alkali carbonate solutions above referred to results in a further modification of the cottonseed meats during the cooking operation so that the subsequent expression of the oil is still further facilitated and the amount of oil which can be subsequently expressed materially increased. The subsequent refining of the oil likewise seems to be promoted by the process above described.

It will be evident that various types and arrangements of apparatus are available for the practice of the invention and that many of the common types of apparatus may be used without substantial change, provided that the alkali carbonate solution is intimately and thoroughly distributed throughout the ground pulp. The solution may thus be added in a continuous manner and continuously intermixed with the crushed meats while they are passing from the crushing rolls to the cooker, the amount of solution being properly regulated so that a uniform amount may be incorporated with the meats.

The alkali carbonate solutions utilized according to the present invention, have the further advantage that the cottonseed meal resulting from the process is not injuriously affected, but may even be improved by the treatment. Sodium bicarbonate is thus a common ingredient of baking powders utilized in food preparations and the minute amount used in the process of the present invention does not leave sufficient of the reagent to injure the meal in any way. The meal resulting from the process of the present invention can accordingly be used for the same purposes and in the same manner as ordinary meal, or where an improved meal is desired.

As above stated, I have found sodium bicarbonate particularly valuable for use in the alkali carbonate solutions according to the present invention; but it will be understood that other alkali carbonate solutions can be used in a similar manner provided the solutions are of appropriate strength and used in such small amounts that the desired improvement is obtained without any appreciable saponification or neutralization of the free fatty acids present. The normal sodium carbonate should accordingly be used in correspondingly smaller amounts or in such amounts that it will enable the improved results above described to be obtained.

The utilization of the dilute alkali carbonate solutions, according to the present invention, enables a somewhat larger amount of moisture to be incorporated with the crushed meats during the cooking operation, thereby further improving the cooking process. The alkali carbonate solutions will themselves supply a substantial amount of water for this purpose, but it will be evident that, where the use of an increased or decreased amount of water may be desirable, the amount of water added with the solutions, or otherwise added, may be correspondingly increased or decreased.

Having thus described my invention, what I claim is:—

1. The method of improving the extraction of oil from cottonseed meats, which comprises cooking the crushed meats in intimate admixture with a small amount of a dilute alkali carbonate solution, and expressing the oil from the cooked meats; substantially as described.

2. The method of improving the extraction of oil from cottonseed meats, which comprises intimately incorporating with the crushed meats a small amount of a dilute alkali carbonate solution, subjecting the resulting meats to a cooking operation, and expressing the oil from the cooked meats; substantially as described.

3. The method of improving the extraction of oil from cottonseed meats, which comprises cooking the crushed meats in intimate admixture with a small amount of a dilute solution of sodium bicarbonate, and expressing the oil from the cooked meats; substantially as described.

4. The method of improving the extraction of oil from cottonseed meats, which comprises intimately incorporating with the crushed meats a small amount of a dilute solution of sodium bicarbonate, subjecting the resulting meats to a cooking operation, and expressing the oil from the cooked meats; substantially as described.

5. The method of improving the extraction of oil from cottonseed meats, which comprises cooking the crushed meats in intimate admixture with a dilute solution of sodium bicarbonate containing about one-tenth pound of the bicarbonate per gallon, and the solution being used in the proportions of about three gallons per ton of seed, and expressing the oil from the cooked meats; substantially as described.

6. The method of improving the extraction of oil from cottonseed meats, which comprises intimately incorporating with the crushed meats a dilute solution of sodium bicarbonate containing about one-tenth pound of the bicarbonate per gallon, and about three gallons of the solution being utilized per ton of seed, subjecting the resulting meats to a cooking operation, and expressing the oil from the cooked meats; substantially as described.

In testimony whereof I affix my signature.

CECIL O. PHILLIPS.